US009964070B2

(12) United States Patent
Cerra et al.

(10) Patent No.: US 9,964,070 B2
(45) Date of Patent: May 8, 2018

(54) GAS TURBINE ENGINE NOZZLE INCLUDING HOUSING HAVING SCALLOPED ROOT REGIONS

(71) Applicant: The Boeing Company, Chicago, IL (US)

(72) Inventors: David F. Cerra, Bellevue, WA (US); Lie-Mine Gea, Irvine, CA (US); Robert H. Willie, Bothell, WA (US); Leonard J. Hebert, Kirkland, WA (US); Donald E. Robinson, Mercer Island, WA (US)

(73) Assignee: The Boeing Company, Chicago, IL (US)

( * ) Notice: Subject to any disclaimer, the term of this patent is extended or adjusted under 35 U.S.C. 154(b) by 912 days.

(21) Appl. No.: 13/746,277

(22) Filed: Jan. 21, 2013

(65) Prior Publication Data

US 2014/0202164 A1  Jul. 24, 2014
US 2017/0298868 A9  Oct. 19, 2017

Related U.S. Application Data

(63) Continuation of application No. 12/483,424, filed on Jun. 12, 2009, now Pat. No. 8,356,468.

(51) Int. Cl.
*F02K 1/34* (2006.01)
(52) U.S. Cl.
CPC ............ *F02K 1/34* (2013.01); *F05D 2240/14* (2013.01)

(58) Field of Classification Search
CPC ... F02K 1/34; F02K 1/386; F02K 1/48; F05D 2240/14
See application file for complete search history.

(56) References Cited

U.S. PATENT DOCUMENTS

| | | | | |
|---|---|---|---|---|
| 3,648,800 | A * | 3/1972 | Hoerst | 181/213 |
| 6,360,528 | B1 * | 3/2002 | Brausch et al. | 60/262 |
| 7,735,601 | B1 * | 6/2010 | Stieger et al. | 181/213 |
| 8,356,468 | B2 * | 1/2013 | Cerra et al. | 60/262 |
| 2003/0021089 | A1 * | 1/2003 | Belady et al. | 361/695 |
| 2004/0244357 | A1 * | 12/2004 | Sloan | F02K 1/38 60/262 |
| 2005/0172611 | A1 * | 8/2005 | Blodgett et al. | 60/262 |
| 2007/0033922 | A1 * | 2/2007 | Reba et al. | 60/262 |
| 2009/0071164 | A1 * | 3/2009 | Renggli | 60/770 |
| 2010/0313545 | A1 * | 12/2010 | Cerra et al. | 60/204 |

FOREIGN PATENT DOCUMENTS

EP          1703114 A1 *  9/2006

* cited by examiner

*Primary Examiner* — Ted Kim
(74) *Attorney, Agent, or Firm* — Miller, Matthias & Hull LLP (57) ABSTRACT

A gas turbine engine exhaust nozzle comprises a housing having an aft end that terminates in a row of chevrons. At least one surface of the housing has scalloped root regions proximate bases of adjacent chevrons. The scalloped root regions have a reduced thickness relative to the rest of the aft end.

20 Claims, 7 Drawing Sheets

GAS TURBINE ENGINE NOZZLE INCLUDING HOUSING HAVING SCALLOPED ROOT REGIONS

This is a continuation of U.S. Ser. No. 12/483,424 filed 12 Jun. 2009, now U.S. Pat. No. 8,356,468.

BACKGROUND

Aircraft engines have been made quieter as a result of advanced high bypass ratio engines. High bypass ratio engines derive a substantial fraction of their total thrust from bypass air which is propelled around the core of the engine by an engine-driven forwardly mounted fan. This approach results in less engine noise than pure turbojet engines or low bypass ratio engines.

One approach to further reducing engine noise is to increase the amount of mixing between the high velocity gases exiting the engine, and the surrounding freestream air. In that regard, the use of geometric structures known as chevrons may reduce low-frequency noise by increasing the rate at which the engine flow streams mix with the surrounding freestream air in the aft region of the nozzle. However, in some circumstances existing chevron designs may increase the drag of the duct, thereby decreasing engine efficiency.

SUMMARY

According to an embodiment herein, a gas turbine engine exhaust nozzle comprises a housing having an aft end that terminates in a row of chevrons. At least one surface of the housing has scalloped root regions proximate bases of adjacent chevrons. The scalloped root regions have a reduced thickness relative to the rest of the aft end.

According to another embodiment herein, a gas turbine engine comprises a nozzle including a housing. An aft end of the housing terminates in a row of chevrons. At least one surface of the housing has scalloped root regions proximate bases of adjacent chevrons. Thickness of the housing is reduced in a cross-sectional plane drawn through the scalloped root region.

According to another embodiment herein, an aircraft comprises a propulsion system including at least one gas turbine engine. Each engine includes a nozzle having a housing. The housing has an aft end that terminates in a row of chevrons. At least one surface of the housing has scalloped root regions proximate bases of adjacent chevrons. The scalloped root regions have a reduced thickness relative to the rest of the aft end.

These features and functions may be achieved independently in various embodiments or may be combined in other embodiments. Further details of the embodiments can be seen with reference to the following description and drawings.

DETAILED DESCRIPTION

A gas turbine engine exhaust nozzle herein includes a housing having an aft end that terminates in a row of chevrons. Chevrons generally include certain types of serrations on the nozzle lip, typically, triangular or sinusoidal in shape having some curvature in the lengthwise cross-section, which slightly immerses them in the adjacent flow. A chevron may project either inwardly or outwardly, by an amount that is on the order of the upstream boundary layer thickness on the inner or outer surface, respectively. In general, the chevron planform shape may also be trapezoidal or rectangular.

The chevrons define a root region proximate the base of adjacent chevrons. Portions of an interior surface of the housing, or an exterior surface of the housing, or portions of both surfaces, are removed proximate the root regions of the chevrons to define regions referred to herein as "scalloped" root regions. Some or all of the root regions may be scalloped. In some embodiments, a result of the scalloped root regions is that the thickness of the housing varies in a cross-sectional plane drawn through the root regions of the housing.

Figure 3A:
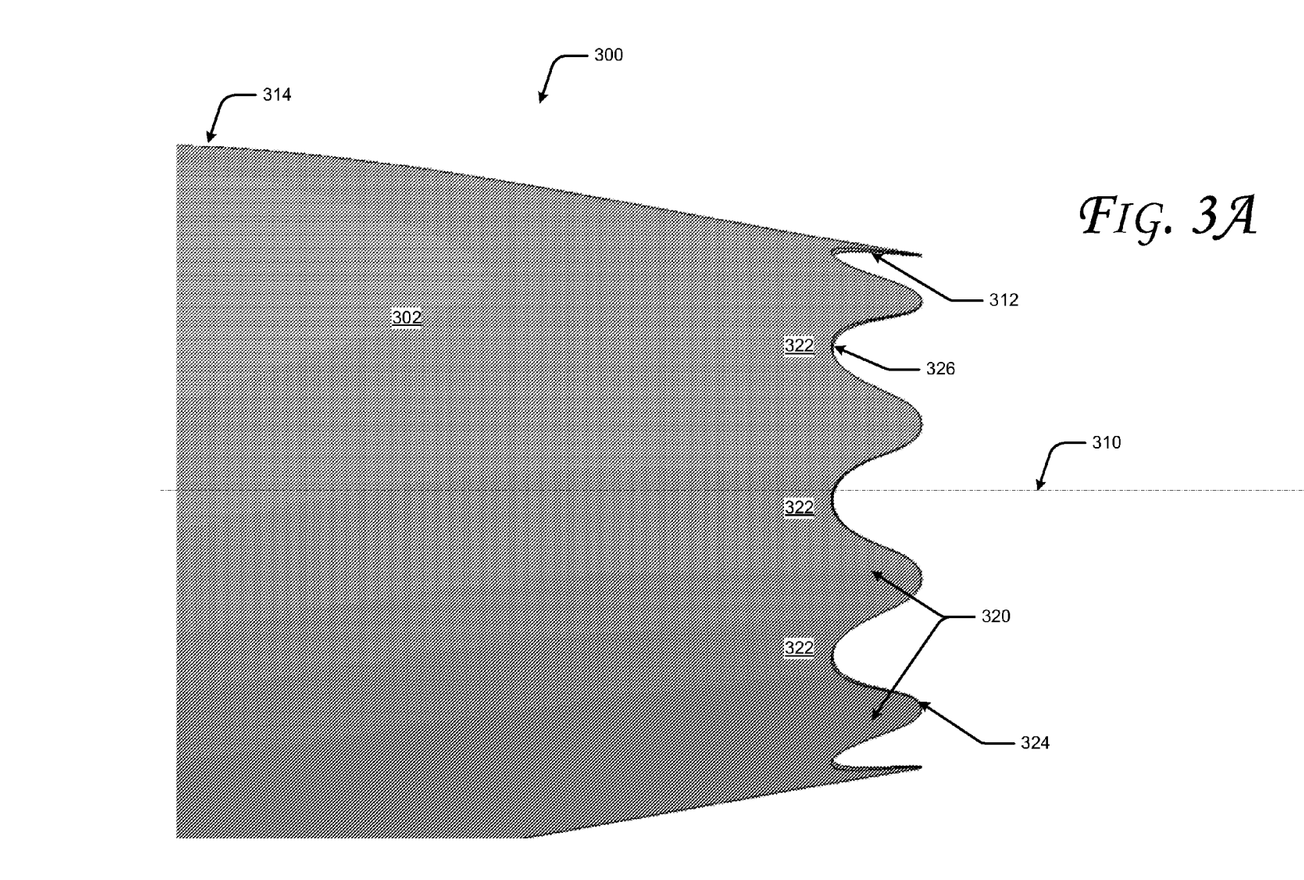
FIG. 3A is an illustration of a gas turbine engine nozzle.

FIG. 3A illustrates an embodiment of a gas turbine engine nozzle 300 including an annular housing 302 having a length which extends along a central longitudinal axis 310 and comprising an interior surface 312 and an exterior surface 314. An aft end of the housing terminates in a row of chevrons 320. Each chevron 320 has a tip 324 and a base 326. The chevrons 324 define root regions 322 proximate the bases 326.

In some embodiments, the row of chevrons 320 encompasses the complete annulus of the aft end of the housing 302, while in other embodiments the row of chevrons 320 may encompass only a portion of the annulus of the housing 302. In the embodiment of FIG. 3A, the various chevrons 320 are substantially uniform in size and shape. In other embodiments, the various chevrons may vary in size and shape, e.g., to reduce noise in selected directions.

In the embodiment of FIG. 3A, the surface of the annular housing 302 converges toward the longitudinal axis 310 proximate the aft end of the housing 302, such that the diameter of the housing 302 decreases progressively toward the aft end of the housing 302. In some embodiments, the row of chevrons 320 essentially follows the contoured surface of the housing 302 such that each of the chevrons 320 lies in a plane that intersects the longitudinal axis 310.

Figure 3B:
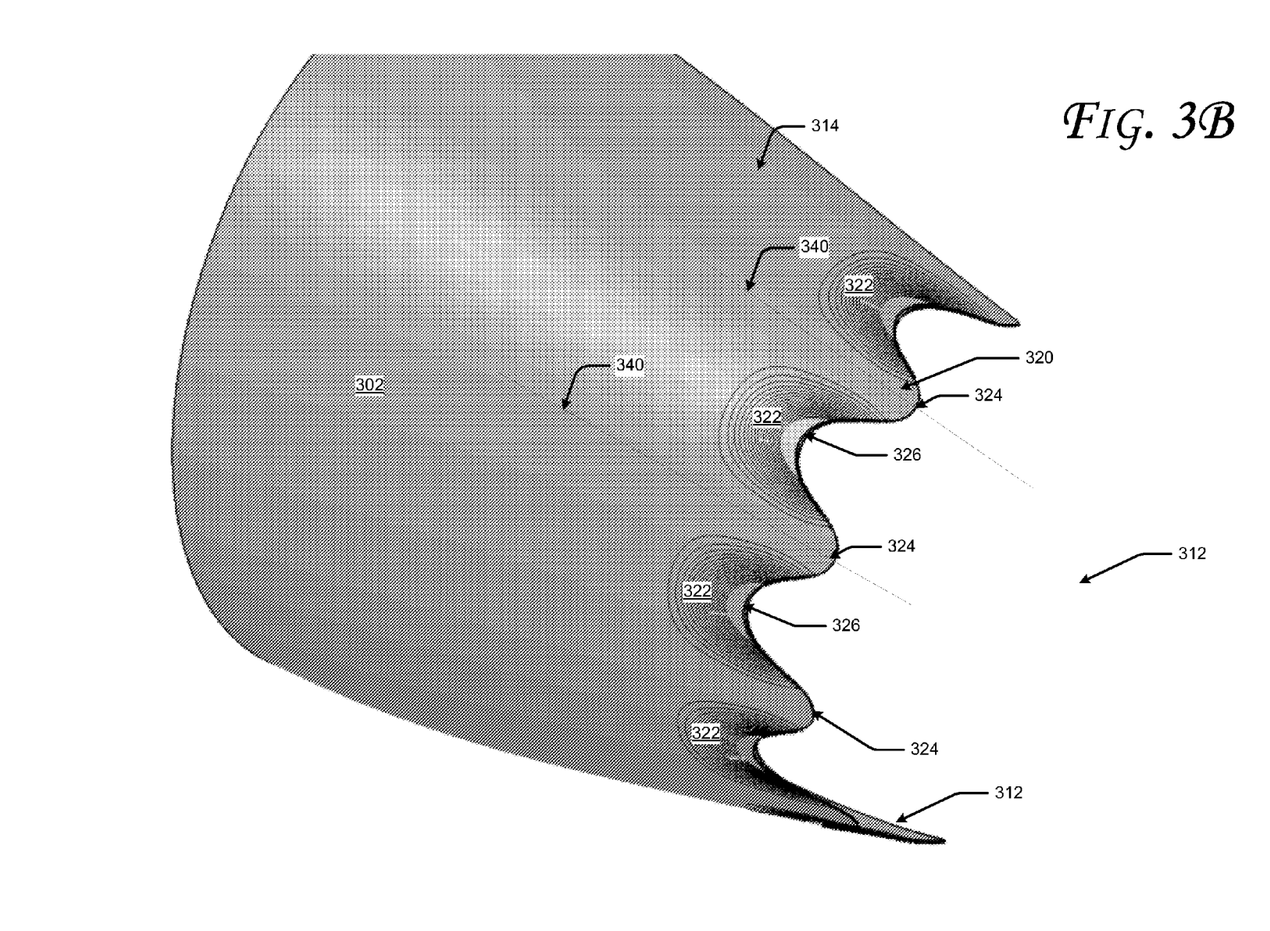
FIG. 3B is an illustration of a scalloped chevron gas turbine engine nozzle surface.

FIG. 3B illustrates an embodiment in which at least a portion of at least one of the interior surface 312 and the exterior surface 314 is scalloped proximate the root region 322 of a chevron 320. Portions of the root regions 322 are removed to define scalloped surface areas in the root regions 322. The scalloped root regions 322 in FIG. 3B are depicted by contoured lines analogous to topographical lines on a map. The scalloped root regions are generally laterally displaced from an axis 340 extending longitudinally along the surface 302 of the nozzle 300 and through the tip 324 of adjacent chevrons 320, and extend from the base 326 of the chevron. In some embodiments, the chevrons measure between 10 centimeters and 60 centimeters from the base to the tip, and the scalloped root regions 322 measure between approximately 5 and 75 centimeters in width and 5 and 90 centimeters in length. More generally, however, the specific measurements may vary both as a function of engine size and as a function of engine load.

Figure 3C:
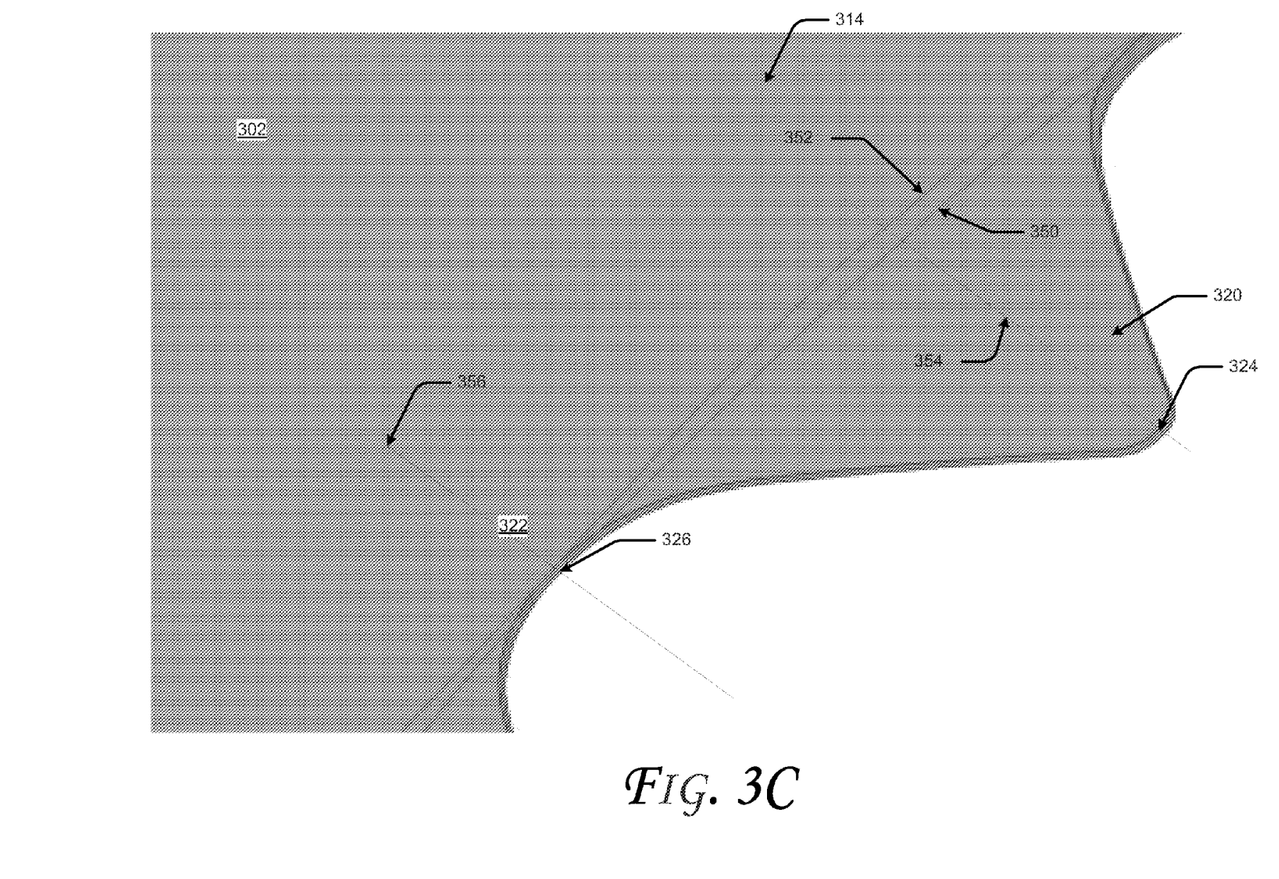
FIG. 3C is an illustration of a section of a scalloped gas turbine engine chevron nozzle.

As illustrated in FIG. 3c, a result of the scalloped root regions 322 is that the thickness of the annular housing 302 varies in a cross-sectional plane drawn through the root regions 322 of the housing 302. The thickness of the housing 302 is depicted by contour lines 350 and 352, which follow the interior surface 312 of housing 302 and the exterior surface 314 of housing 302, respectively. The thickness of the housing 302 varies between a maximum thickness at a point along a longitudinal axis 354 extending through the tip 324 of the chevron 320 to a minimum at a point along a longitudinal axis 356 extending through the base 326 of the chevron. In some embodiments, the thickness of the housing 302 varies between a maximum thickness of 2.5 centimeters and a minimum thickness of 0.25 centimeters. More generally, however, the thickness of the housing 302 varies both as a function of the engine size and as a function of engine load.

Figure 4:
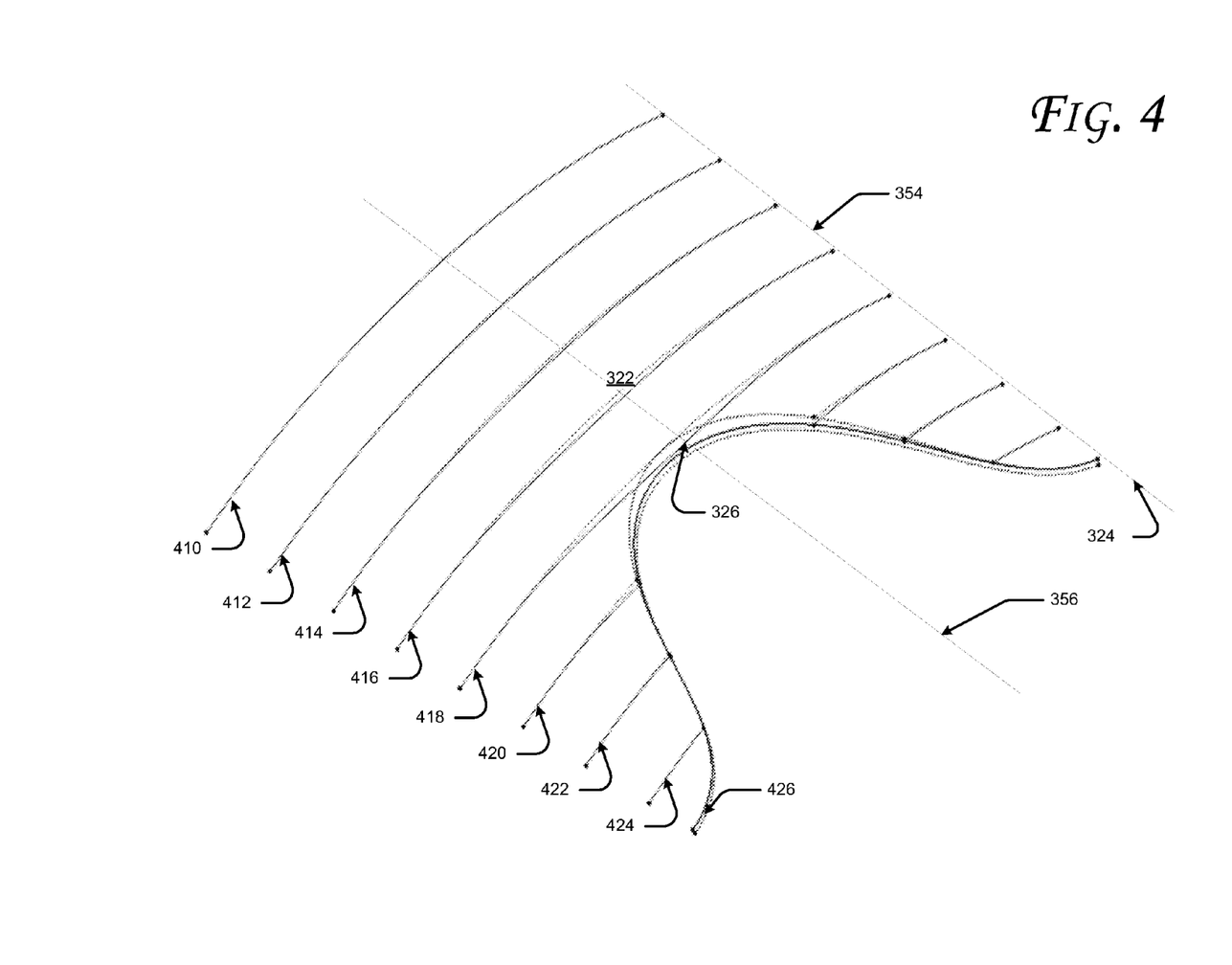
FIG. 4 is an illustration of a scalloped chevron gas turbine engine nozzle surface.

FIG. 4 is a schematic, perspective line view of a scalloped chevron nozzle surface. The scalloped surface is represented by solid contour lines. The scalloped root region is indicated generally by reference numeral 322. The contour lines 410, 412, 414, 416, 418, 420, 422, and 424 represent lateral cross-section contour lines at various positions along the longitudinal axis 356 of the housing 302. The first contour line 410 represents a lateral cross-section taken outside the scalloped root region 322. In this region the contour lines are coextensive. However, the contour lines diverge as they approach the base 326 of the chevron. Thus, the surfaces begin to diverge when the contour line 412 crosses the scalloped region 322. Successive contour lines 414, 416, 418, show increasing greater divergence between the surface contours. The divergence is at a maximum along the longitudinal axis 356 that extends through the base 326 of the chevron and the contour lines converge at a point along a longitudinal axis 354 extending through the tip 324 of the chevron.

Figure 5:
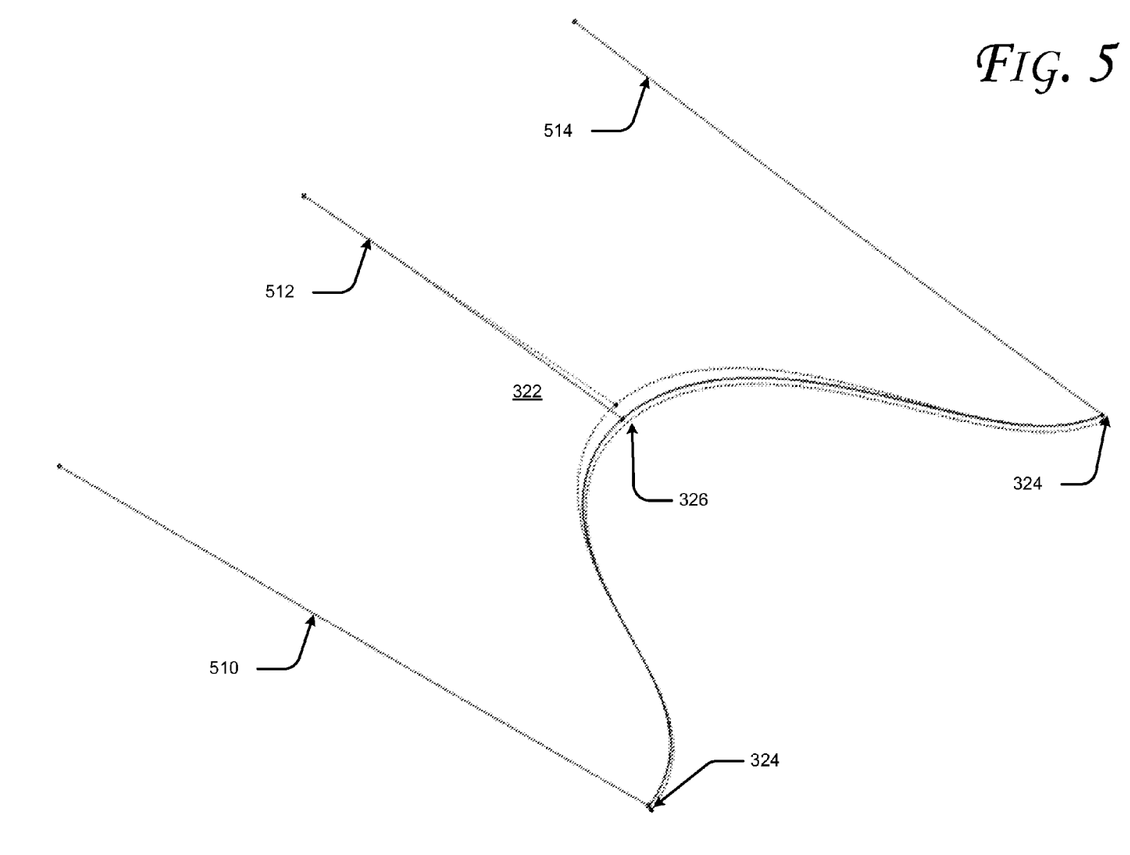
FIG. 5 is an illustration of a scalloped chevron gas turbine engine nozzle surface.

FIG. 5 is a schematic, perspective line view of a scalloped chevron nozzle surface. In FIG. 5, the scalloped surface is indicated by solid contour lines. The scalloped root region is indicated generally by reference numeral 322. The contour lines 510, 512, 514 are taken in a longitudinal direction, rather than a lateral direction. Thus, the contour lines 510, 514, taken along a longitudinal axis through the peak 324 of a chevron are substantially coextensive, indicating that the surfaces are of substantially equal thicknesses along those axes. By contrast, the contour lines 512, taken along a longitudinal axis through the base 326 of a chevron diverge as the lines approach the base 326, illustrating the contoured surface of a scalloped chevron root region 322.

FIGS. 4 and 5 also illustrate the differences between housing having a scalloped surface and a conventional, constant-thickness housing. In both figures, the scalloped surface is represented by solid lines, and the conventional surface is indicated by dashed lines.

Figure 1:
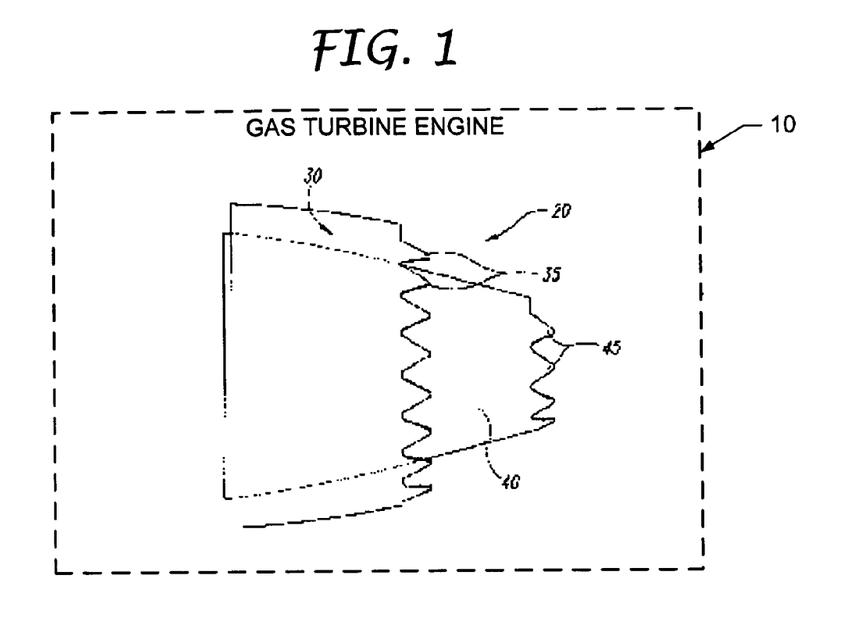
FIG. 1 is an illustration of a gas turbine engine.

FIG. 1 is an illustration of a gas turbine engine 10 including an example of a jet engine nozzle 20. The nozzle 20 includes a core flow duct 40, and a fan flow duct 30 arranged annularly around the core flow duct 40. During operation of the gas turbine engine 10, engine core flow is directed through the core flow duct 40, and fan air passes through the fan flow duct 30. An exit aperture of the core flow duct 40 may include core flow chevrons 45, and an exit aperture of the fan flow duct 30 may include fan flow chevrons 35.

Figure 2:
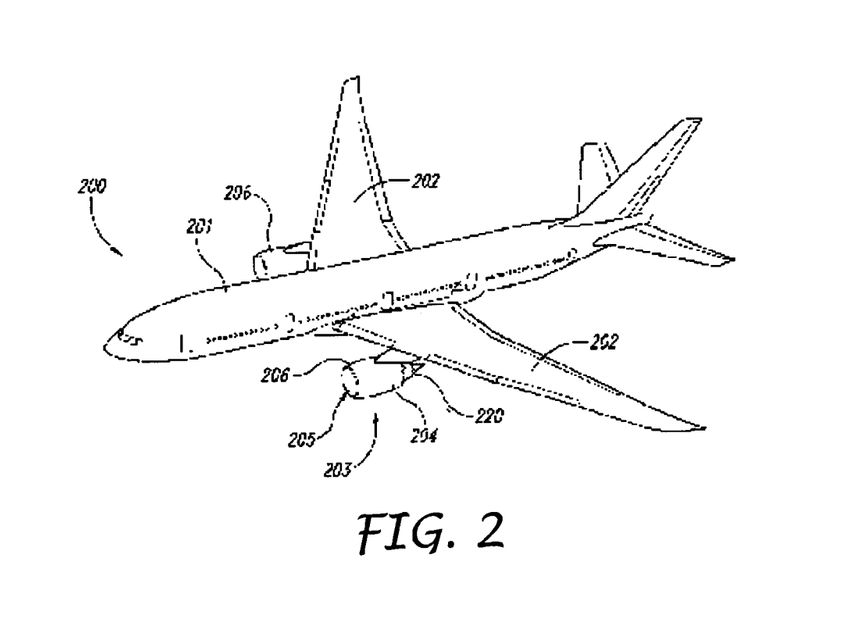
FIG. 2 is an illustration of an aircraft including gas turbine engines.

FIG. 2 is a schematic illustration of a commercial jet transport aircraft 200 including a fuselage 201, wings 202, and a propulsion system 203. The propulsion system 203 includes at least one gas turbine engine 206. In some embodiments, each gas turbine engine 206 may be a turbofan engine. Each engine 206 is housed in a nacelle 204, which includes an inlet 205 and a nozzle 220. Each nozzle 220 includes chevrons having scalloped root regions to reduce the coefficient of drag associated with the nozzles 220.

Other embodiments of an aircraft herein may include a different number of engines and/or engines carried by different portions of the aircraft, along with nozzles herein that are tailored to the particular installation.

Figure 6:
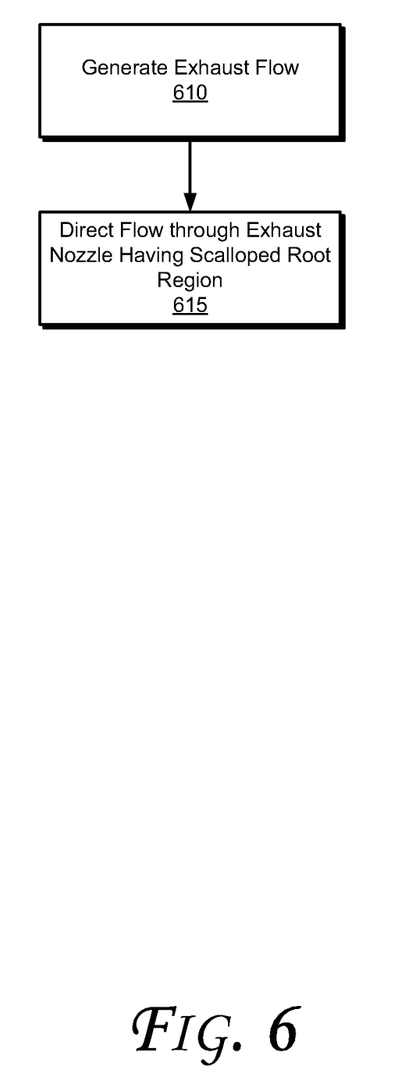
FIG. 6 is an illustration of a method of operating a gas turbine engine of an aircraft.

FIG. 6 illustrates a method of operating an engine 206 of the jet. At operation 610, an exhaust flow is generated. At operation 615, the exhaust flow is directed through the exhaust nozzle have at least one scalloped root region. The scalloped root regions may decrease the drag coefficient of the nozzle, thereby increasing efficiency of the engine 206. Alternatively, or in addition, the scalloped root regions may tailor airflow through the engine 206.

The invention claimed is:

1. A gas turbine engine exhaust nozzle, comprising:
    a housing having a length extending along a central longitudinal axis and comprising an interior surface and an exterior surface, wherein the housing comprises a contoured profile which converges toward the central longitudinal axis proximate the aft end of the housing; and
    a row of chevrons extending from the aft end of the housing, each chevron having a tip, the row of chevrons including bases between adjacent chevrons with a root region adjacent each base, an associated longitudinal axis extending through each base, the row of chevrons following the contoured profile of the housing such that the tip of each chevron lies in a plane that intersects the central longitudinal axis;
    wherein portions of at least one of the interior surface or the exterior surface are scalloped proximate each root region to form scallop shaped regions of reduced thickness relative to the rest of the chevrons; and
    wherein each scallop shaped region is defined by a distance between the housing interior surface and the housing exterior surface that monotonically increases, along the associated longitudinal axis extending through the base, from a minimum thickness at the base to a maximum thickness forward of the scallop shaped region.

2. The nozzle of claim 1, wherein the exterior surface defines exterior surface lateral contour lines extending through the bases and the interior surface defines interior surface lateral contour lines extending through the bases, and the scallop shaped regions are further defined by distances between the exterior surface lateral contour lines and the interior surface lateral contour lines that monotonically decrease from maximum distances at longitudinal axes extending through the tips of the chevrons to minimum distances at longitudinal axes extending through the bases.

3. The nozzle of claim 1, wherein a distance between the housing interior surface and the housing exterior surface is constant along housing longitudinal axes extending through the tips of the chevrons.

4. The nozzle of claim 1, wherein the housing continuously extends between the housing interior surface and the housing exterior surface.

5. The nozzle of claim 1, wherein the row of chevrons extends entirely about the aft end of the housing.

6. The nozzle of claim 1, wherein each chevron measures between 10 centimeters and 60 centimeters from the base to the tip, and each root region is 5 to 75 centimeters in width and 5 to 90 centimeters in length.

7. The nozzle of claim 1, wherein the chevrons vary in size and shape.

8. A gas turbine engine exhaust nozzle, comprising:
a housing having a length extending along a central longitudinal axis and comprising an interior surface and an exterior surface, wherein the housing comprises a contoured profile which converges toward the central longitudinal axis proximate the aft end of the housing; and
a row of chevrons extending from the aft end of the housing, each chevron having a tip, the row of chevrons including bases between adjacent chevrons with a root region adjacent each base, the row of chevrons following the contoured profile of the housing such that the tip of each chevron lies in a plane that intersects the central longitudinal axis;
wherein portions of at least one of the interior surface or the exterior surface are scalloped proximate each root region to form scallop shaped regions of reduced thickness relative to the rest of the housing; and
wherein the exterior surface defines exterior surface lateral contour lines extending through the bases and the interior surface defines interior surface lateral contour lines extending through the bases, and the scallop shaped regions are further defined by distances between the exterior surface lateral contour lines and the interior surface lateral contour lines that monotonically decrease from maximum distances at longitudinal axes extending through the tips of the chevrons to minimum distances at longitudinal axes extending through the bases.

9. The nozzle of claim 8, wherein an associated housing axis extends through each base, and wherein each scallop shaped region is further defined by a distance between the housing interior surface and the housing exterior surface that monotonically increases, along the associated longitudinal axis extending through the base, from a minimum thickness at the base to a maximum thickness forward of the scalloped shaped region.

10. The nozzle of claim 8, wherein a distance between the housing interior surface and the housing exterior surface is constant along housing longitudinal axes extending through the tips of the chevrons.

11. The nozzle of claim 8, wherein the housing continuously extends between the housing interior surface and the housing exterior surface.

12. The nozzle of claim 8, wherein the row of chevrons extends entirely about the aft end of the housing.

13. The nozzle of claim 8, wherein each chevron measures between 10 centimeters and 60 centimeters from the base to the tip, and each root region is 5 to 75 centimeters in width and 5 to 90 centimeters in length.

14. The nozzle of claim 8, wherein the chevrons vary in size and shape.

15. An aircraft comprising a propulsion system including at least one gas turbine engine having an exhaust nozzle, comprising:
a housing having a length extending along a central longitudinal axis and comprising an interior surface and an exterior surface, wherein the housing comprises a contoured profile which converges toward the central longitudinal axis proximate the aft end of the housing; and
a row of chevrons extending from the aft end of the housing, each chevron having a tip, the row of chevrons including bases between adjacent chevrons with a root region adjacent each base, an associated longitudinal axis extending through each base, the row of chevrons following the contoured profile of the housing such that the tip of each chevron lies in a plane that intersects the central longitudinal axis;
wherein portions of at least one of the interior surface or the exterior surface are scalloped proximate each root region to form scallop shaped regions of reduced thickness relative to the rest of the housing;
wherein each scallop shaped region is defined by a distance between the housing interior surface and the housing exterior surface that monotonically increases, along the associated longitudinal axis extending through the base, from a minimum thickness at the base to a maximum thickness forward of the scalloped shaped region; and
wherein the exterior surface defines exterior surface lateral contour lines extending through the bases and the interior surface defines interior surface lateral contour lines extending through the bases, and the scallop shaped regions are further defined by distances between the exterior surface lateral contour lines and the interior surface lateral contour lines that monotonically decrease from maximum distances at longitudinal axes extending through the tips of the chevrons to minimum distances at longitudinal axes extending through the bases.

16. The aircraft of claim 15, wherein a distance between the housing interior surface and the housing exterior surface is constant along housing longitudinal axes extending through the tips of the chevrons.

17. The aircraft of claim 15, wherein the housing continuously extends between the housing interior surface and the housing exterior surface.

18. The aircraft of claim 15, wherein the row of chevrons extends entirely about the aft end of the housing.

19. The aircraft of claim 15, wherein each chevron measures between 10 centimeters and 60 centimeters from the base to the tip, and each root region is 5 to 75 centimeters in width and 5 to 90 centimeters in length.

20. The aircraft of claim 13, wherein the engine is a turbofan engine.

* * * * *